(12) United States Patent
Cantrill

(10) Patent No.: US 7,437,612 B1
(45) Date of Patent: Oct. 14, 2008

(54) POSTMORTEM DETECTION OF OWNED MUTUAL EXCLUSION LOCKS

(75) Inventor: Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 619 days.

(21) Appl. No.: 10/946,226

(22) Filed: Sep. 21, 2004

(51) Int. Cl.
*G06F 11/00* (2006.01)

(52) U.S. Cl. .............................. 714/37; 714/25; 714/38; 707/206

(58) Field of Classification Search ........................ None
See application file for complete search history.

(56) References Cited

U.S. PATENT DOCUMENTS 6,427,235 B1 * 7/2002 Kosche et al. ............... 717/148
6,523,141 B1 * 2/2003 Cantrill ......................... 714/48
6,560,627 B1 * 5/2003 McDonald et al. ........... 718/103
6,886,081 B2 * 4/2005 Harres ......................... 711/152
6,944,722 B2 * 9/2005 Cantrill ....................... 711/147
7,047,447 B2 * 5/2006 Cantrill ......................... 714/38
2003/0188227 A1 * 10/2003 Maison et al. ................ 714/42
2004/0054861 A1 * 3/2004 Harres ......................... 711/163
2004/0205302 A1 * 10/2004 Cantrill ....................... 711/141
2004/0205399 A1 * 10/2004 Wang et al. ................... 714/25
2005/0120273 A1 * 6/2005 Hudson et al. ................ 714/38

* cited by examiner

*Primary Examiner*—Christopher S McCarthy
(74) *Attorney, Agent, or Firm*—Osha Liang LLP

(57) ABSTRACT

In general, in one aspect, the invention relates to a method for identifying lock ownership, including identifying at least one node in the crash dump, characterizing the at least one node in the crash dump as a node of inferred type and appending the at least one node to a list of nodes of inferred type, determining whether each node in the list of nodes of inferred type is a structure, and for each node in the list of nodes determined to be a structure determining whether each member in each node corresponds to a lock, and determining an owner of the lock.

21 Claims, 5 Drawing Sheets

```
> ::findlocks
de692160 is owned by e5c22e40
de53f140 (struct plock.pl_lock) is owned by deaf0a00
de79f760 (struct inode.i_vnode.v_lock) is owned by deaeb880
fec19480 (cpu_lock) is owned by deaf0ba0
fece44dc (pidlock) is owned by e5c48e40
findlocks: nota bene: other locks may be held
> ::findlocks
300182d9a78 (struct segkp_data.kp_lock) is owned by 140a000
3001c69ca80 (struct anon_map.serial_lock) is owned by 3008de45a40
3000d2c46f0 is owned by 3008de45a40
3000c43b658 (struct anon_map.serial_lock) is owned by 30018a7bce0
3001aabdca8 (struct anon_map.serial_lock) is owned by 30018a7a2a0
30011b8c390 (struct anon_map.serial_lock) is owned by 30011bb6d20
30011b8c898 (struct anon_map.serial_lock) is owned by 30018a73d00
30011b8c940 (struct anon_map.serial_lock) is owned by 30018a7ad20
3008423e740 (struct anon_map.serial_lock) is owned by 30078e06d20
30320df6118 (struct anon_map.serial_lock) is owned by 30084296800
300841be820 (struct anon_map.serial_lock) is owned by 3001ccfd260
30320f5dcf0 (struct anon_map.serial_lock) is owned by 3000c442fe0
14b4a18 (pageout_mutex) is owned by 2a100527d40
14cc7a8 (ufs_scan_lock) is owned by 3000c4437c0
findlocks: nota bene: other locks may be held
```

Figure 3

POSTMORTEM DETECTION OF OWNED MUTUAL EXCLUSION LOCKS

BACKGROUND

Presently, computer systems and the operation thereof are utilized in all facets of modern life. For example, computer systems are common both at home and in the workplace to increase productivity as well as provide user conveniences. Accordingly, there is a need for many different types of software to operate on computer systems. However, with the increased number and complexity of operating systems and the software operating thereon, the probability of technical errors and computer system crashes and/or failures has become increasingly likely. This trend has led to an increased emphasis on analysis of crash dumps to determine the root cause of a system failure.

When debugging parallel software systems postmortem (i.e., after the system has failed), it is often useful to know which mutually exclusive regions a given thread has access to (or had access to prior to system failure). The mutually exclusive regions correspond to regions that the thread enters by acquiring a mutual exclusion lock ("mutex"). Knowledge of the mutually exclusive regions that a thread has exclusive access to may provide insight into the state of the system at the time of the failure, and therefore aids analysis of the root cause of the system failure. For a given thread, the thread stack at the time the system failed may be inferred from the crash dump. From this thread stack, one may be able to infer the mutexes that the given thread should hold. The aforementioned approach typically requires a significant amount of computing power. Further, in some cases it may be difficult to infer which locks are held by a thread from the thread stack alone.

One way to determine which mutexes are owned by which threads is to log, in a global repository, the thread ID and lock address each time a thread acquires possession of a mutex and each time the thread releases the mutex.

SUMMARY

In general, in one aspect, the invention relates to a method for identifying lock ownership, comprising identifying at least one node in the crash dump, characterizing the at least one node in the crash dump as a node of inferred type and appending the at least one node to a list of nodes of inferred type, determining whether each node in the list of nodes of inferred type is a structure, and for each node in the list of nodes determined to be a structure determining whether each member in each node corresponds to a lock, and determining an owner of the lock.

In general, in one aspect, the invention relates to a computer system for identifying lock ownership, comprising a processor, a memory, a storage device, and software instructions stored in the memory for enabling the computer system under control of the processor, to identify at least one node in the crash dump, characterize the at least one node in the crash dump as a node of inferred type and appending the at least one node to obtain a list of nodes of inferred type, determine whether each node in the list of nodes of inferred type is a structure, and for each node in the list of nodes determined to be a structure determine whether each member in each node corresponds to a lock, and determine an owner of the lock.

In general, in one aspect, the invention relates to a computer readable medium for identifying lock ownership, comprising software instructions to identify at least one node in the crash dump, characterize the at least one node in the crash dump as a node of inferred type and appending the at least one node to obtain a list of nodes of inferred type, determine whether each node in the list of nodes of inferred type is a structure, and for each node in the list of nodes determined to be a structure determine whether each member in each node corresponds to a lock, and determine an owner of the lock.

Other aspects of the invention will be apparent from the following description and the appended claims.

BRIEF DESCRIPTION OF DRAWINGS

FIG. 3 is an output of applying an embodiment of the invention to a crash dump in accordance with one embodiment of the invention.

DETAILED DESCRIPTION

Figure 1:
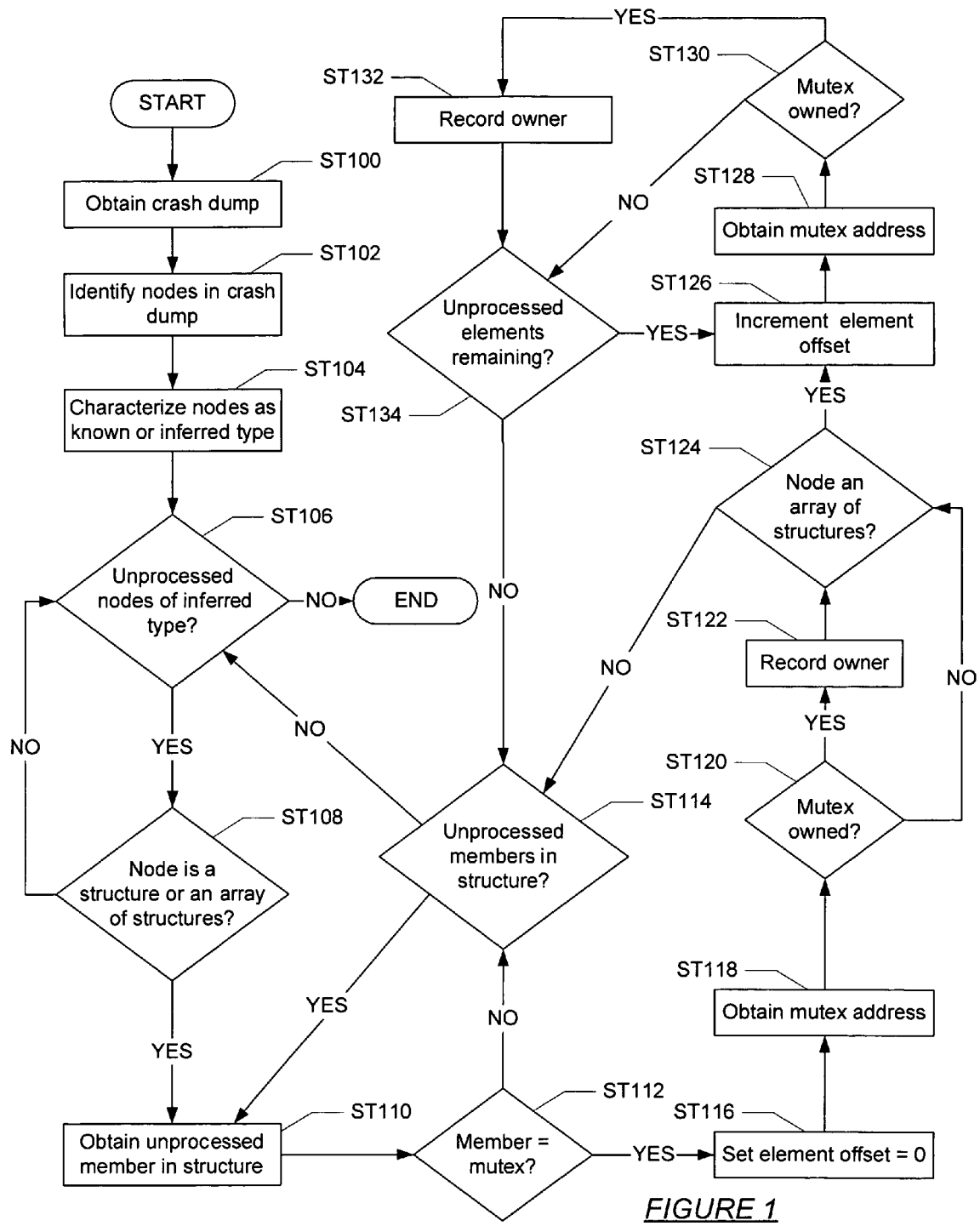
FIG. 1 show segments of a flowchart in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for postmortem detection of owned mutual exclusion locks. More specifically, embodiments of the invention provide a method and apparatus to analyze a crash dump and determine which mutexes are owned by which threads.

FIG. 1 shows a method for determining the owner of a mutex in accordance with one embodiment of the invention. Embodiments of the following method provide a method for detecting lock ownership, thereby facilitating postmortem debugging of system crashes of parallel software systems. Those skilled in the art will appreciate that parallel systems implementing priority inheritance mechanisms are able to derive the thread owner of a mutex by using, for example, the address of the lock. A similar approach may be used in the context of parallel systems that support adaptive locking behavior. Thus, once the threads that owned the various mutexes within the system (at the time of the system crash) are identified using the method shown in FIG. 1, a search for the root cause of the fatal error may be narrowed to those threads having access to the memory at the time of the crash.

The following description details a method for identifying a thread that owns a mutex in accordance with one embodiment of the invention. Initially, the crash dump of the system that failed is obtained (ST100). The crash dump is typically in the form of a text file and is generated by the system that failed while the system is in the process of failing. The crash dump is subsequently analyzed to identify any nodes within the crash dump (ST102). In one embodiment of the invention, a node corresponds to a dynamically allocated memory object. The identified nodes are subsequently characterized as nodes of known type (e.g., static memory objects) and nodes of inferred type (ST104). A method for identifying and characterizing nodes in the crash dump is detailed in commonlyowned U.S. patent application Ser. No. 10/346,423 filed Jan. 16, 2003, entitled "METHOD AND SYSTEM FOR POST-MORTEM OBJECT TYPE IDENTIFICATION", which is hereby incorporated by reference.

Once the nodes have been characterized, the nodes of inferred type are subsequently analyzed in the following manner. Initially, a determination is made whether there are any nodes of inferred type remaining to be processed (ST106). If nodes of inferred type remain to be processed, then a particular unprocessed node of inferred type is selected, and a determination is made whether the node is a structure or an array of structures (ST108). In one embodiment of the invention, the structure corresponds to a "struct" in the C programming language. If the node is not a structure or an array of structures, then processing of the node is complete, and the method returns to ST106.

Alternatively, if the node is a structure or an array of structures, then an unprocessed member (i.e., a variable within the structure) in the node is obtained (ST110). A determination is then made whether the unprocessed member is a mutex (ST112). In one embodiment of the invention, the determination of whether the unprocessed member is a mutex corresponds to determining whether the unprocessed member is of "kmutex_t" type. If the unprocessed member is not a mutex, then a determination is made whether there are any other unprocessed members in the structure that is currently being processed (ST114). If additional unprocessed members exist in the structure, then the method returns to ST110. Alternatively, if there are no remaining unprocessed members, then the method returns to ST106.

However, if the unprocessed member is a mutex, then the element offset (i.e., a counter implemented by the process executing the method) is set to zero (ST116). The address of the unprocessed member (i.e., the address of the mutex) is subsequently obtained (ST118). In one embodiment of the invention, the address of the mutex is determined by adding the base address of the node which contains the mutex to the member offset, thereby producing the mutex address.

Figure 2:
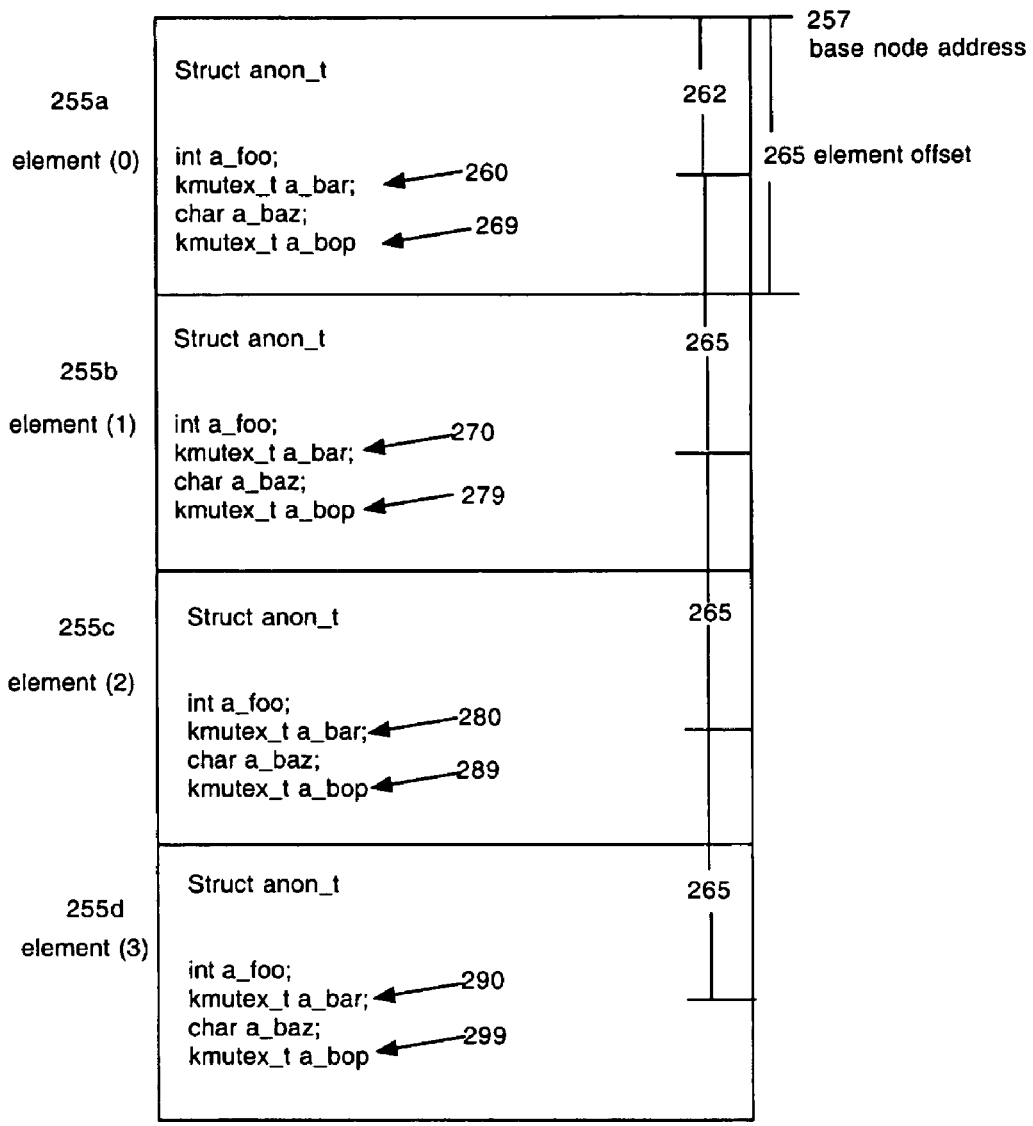
FIG. 2 shows a block diagram in accordance with one embodiment of the invention.
Figure 2A:
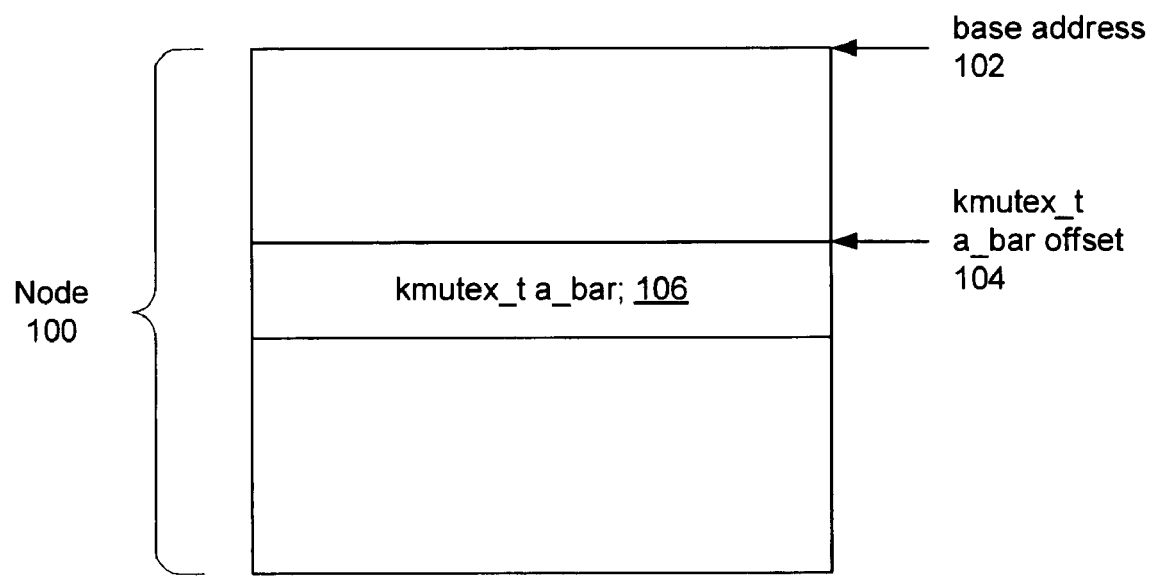

FIG. 2A shows an example of a node in accordance with one embodiment of the invention. More specifically, FIG. 2A shows an example of how the mutex address is determined. For the purposes of the example, the node (100) includes only one member, namely, kmutex_t a_bar (106). Thus, the mutex address of kmutex_t a_bar (106) is determined by adding a kmutex_t a_bar offset (104) to a base address (102) of the node (100).

Continuing with the discussion of FIG. 1, the mutex address is subsequently used to determine whether the mutex is owned (ST120). In one embodiment of the invention, the determination of whether the mutex is owned is performed using information from the crashed system. In particular, because systems, such as parallel processing systems, must be able to determine the owning thread of a mutex given the mutex address to correctly implement priority inheritance, guard against recursive entry, allow for adaptive blocking behavior, etc., the same information may be used to determine the owner of the mutex for debugging purposes.

If the mutex is owned by a thread, then the owner (i.e., the owning thread) is recorded (ST122). The method then proceeds to ST124. Alternatively, if the mutex is not owned (i.e., the owner of the mutex is NULL), then the method proceeds directly to ST124 without recording any ownership information about the mutex. At this stage, a determination is made whether the node that is currently being processed (i.e., the node selected in ST106) is an array of structures (as opposed to just a single structure) (ST124). If the node is not an array of structures, then the method returns to ST114.

Alternatively, if the node is an array of structures, then the element offset (i.e., the element offset initially set to zero in ST116) is incremented (ST126). Subsequently, the mutex address in the next element in the array of structures is obtained (ST128). More specifically, the size of the element is multiplied by the element offset and added to the mutex address obtained in ST118. Once the mutex address of the next element is obtained, a determination is made whether the mutex is owned (ST130). If the mutex is owned by a thread, then the owner (i.e., the owning thread) is recorded (ST132). The method then proceeds to ST134. Alternatively, if the mutex is not owned (i.e., the owner of the mutex is NULL), then the method proceeds directly to ST134 without recording any ownership information about the mutex. A determination is then made whether there are any remaining unprocessed elements in the array of structures (ST134). If elements remain in the array of structures to be processed, then ST126-ST134 are repeated. Alternatively, if no elements remain in the array of structures to be processed, then the method proceeds to ST114.

FIG. 2B shows an example of applying ST126-ST134 to an array of structures in accordance with one embodiment of the invention. FIG. 2B shows a node (250) that is an array of structures containing four elements (i.e., 255a, 255b, 255c and 255d). In accordance with the method described in FIG. 1, element (0) (255a) in the node is initially processed without any knowledge that the node is an array of structures. Once a determination is made that a member (260) (i.e., kmutex_t a_bar) in element (0) (255a) is a mutex, the address of member (260) is determined by adding the members offset (262) (i.e., the offset of member (260)) to a base node address (257) of node (250). After the mutex address of member (260) is obtained, a determination is made whether the node (250) is an array of structures. In the example shown in FIG. 2B, the node (250) is in fact an array of structures, thus the element offset (265) is determined and added to the mutex address of member (260) to obtain the mutex address of member (270) in element (1) (255b) of the node (250) (i.e., ST126 and ST128 in FIG. 1 are performed).

The aforementioned process is repeated to obtain the mutex addresses for member (280) in element (2) (255c) and member (290) in element (3) (255d). Once the mutex addresses for member (260), member (270), member (280), and member (290) are obtained, the process executing the method shown in FIG. 1 returns to element (0) (255a) to continue processing the remaining unprocessed members in element (0) (255a). In the particular example shown in FIG. 2B, element (0) (255a) includes a second mutex, namely member (269) (i.e., kmutex_t a_bop). Thus, the mutex address of member (269) is determined, and then is subsequently used, along with the element offset (265) to obtain the mutex address for member (279), member (289), and member (299).

In one or more embodiments of the invention, the result of performing the aforementioned method as described in FIG. 1 and explained by example in FIGS. 2A and 2B, may include a listing of the various mutex locks in the system and the corresponding owners of the various mutex locks. FIG. 3 shows an output resulting from applying the method described in FIG. 1 to a crash dump. The address of the individual mutex locks identified by applying the method shown in FIG. 1 are located on the left-hand side of the output and are denoted by reference number (310). The addresses of the corresponding threads that own the mutex locks are located on the right-hand side of the output and are denoted by reference number (340). Additional information, such as inferred node structure (320) and mutual exclusion lock type (330), may also be included in the output when available.

Figure 4:
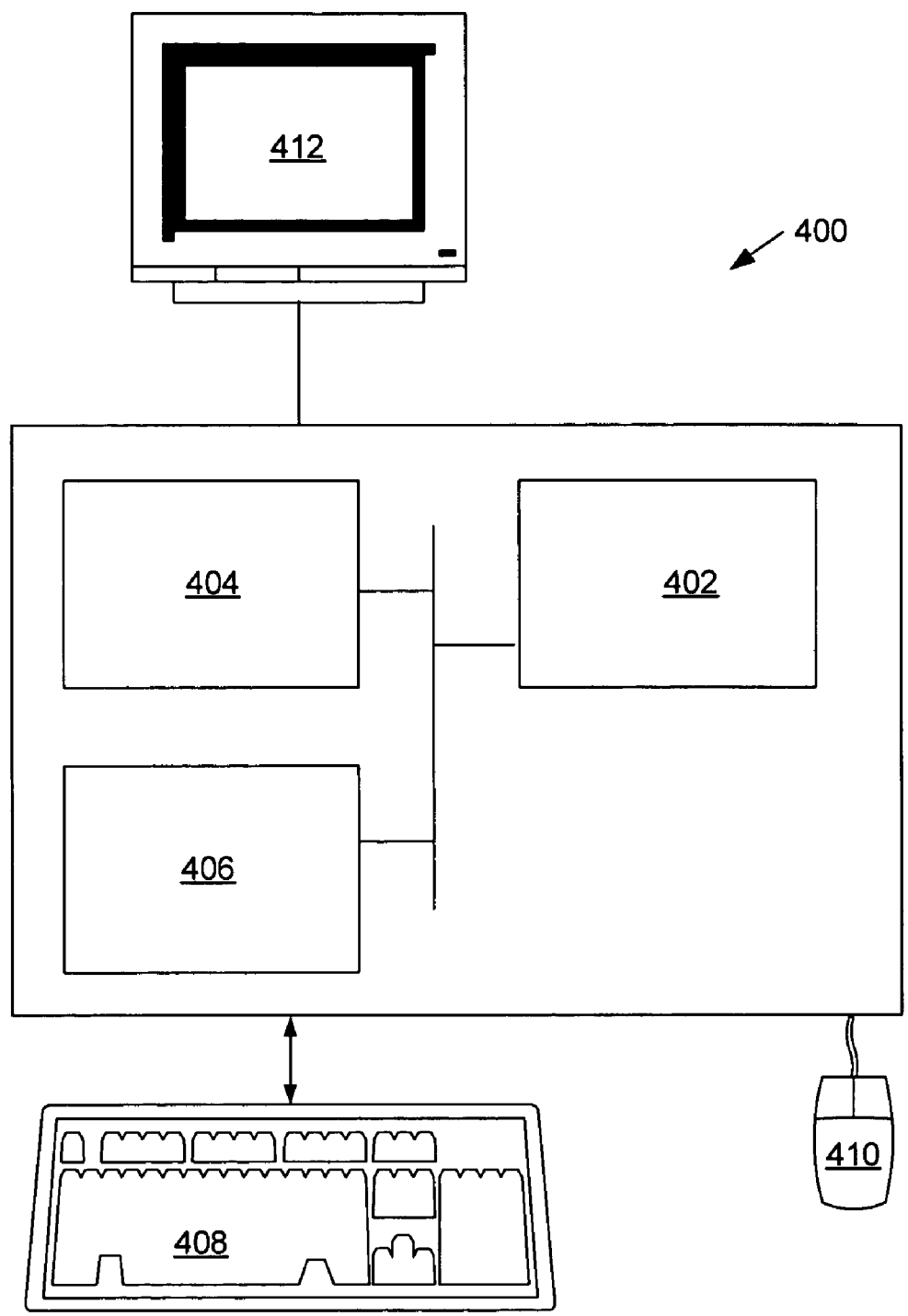
FIG. 4 is a computer system in accordance with one embodiment of the invention.

The invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (400) may be located at a remote location and connected to the other elements over a network.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying lock ownership, comprising:
   identifying at least one node in a crash dump, wherein the at least one node corresponds to a memory object;
   characterizing the at least one node in the crash dump as a node of inferred type and appending the at least one node to a list of nodes of inferred type, wherein the at least one node is of inferred type when the at least one node is initially designated as unknown type and is referenced by another node of known type and wherein the another node of known type is in the crash dump;
   determining whether each node in the list of nodes of inferred type is a structure;
   for each node in the list of nodes determined to be a structure: determining whether each member in each node corresponds to a lock, determining an owner of the lock;
   determining whether each node in the list of nodes of inferred type is an array of structures, and
   for each node in the list of nodes determined to be the array of structures:
     determining whether each member in each structure in the array of structures corresponds to the lock, and
     determining the owner of the lock, wherein determining the owner of the lock comprises:
       determining an address of the member, and
       identifying the owner of the lock using the address.

2. The method of claim 1, further comprising:
   generating a report recording the owner of the lock.

3. The method of claim 2, wherein the report comprises a lock type associated with the lock.

4. The method of claim 1, wherein the owner is a thread.

5. The method of claim 1, wherein the address is determined using a base address of the node, a member offset corresponding to the member, and an element offset corresponding to the structure in the array of structures.

6. The method of claim 5, further comprising:
   initializing the list of nodes by setting the element offset to zero when the lock is a mutual exclusion lock.

7. The method of claim 1, wherein the lock is a mutual exclusion lock.

8. The method of claim 1, wherein determining the owner of the lock comprises:
   determining an address of the member; and
   identifying the owner of the lock using the address.

9. The method of claim 8, wherein the address is determined using a base address of the node and a member offset corresponding to the member.

10. The method of claim 1, wherein the at least one node is generated by a system using priority inheritance to assign threads to the lock.

11. The method of claim 1, wherein the at least one node is generated by a system using adaptive locking behavior to assign threads to the lock.

12. A computer system for identifying lock ownership, comprising:
    a processor;
    a memory;
    a storage device; and
    software instructions stored in the memory for enabling the computer system under control of the processor, to:
      identify at least one node in a crash dump, wherein the at least one node corresponds to a memory object;
      characterize the at least one node in the crash dump as a node of inferred type and appending the at least one node to obtain a list of nodes of inferred type, wherein the at least one node is of inferred type when the at least one node is initially designated as unknown type and is referenced by another node of known type and wherein the another node of known type is in the crash dump;
      determine whether each node in the list of nodes of inferred type is a structure;
      for each node in the list of nodes determined to be a structure:
        determine whether each member in each node corresponds to a lock,
        determine an owner of the lock;
      determine whether each node in the list of nodes of inferred type is an array of structures; and
      for each node in the list of nodes determined to be the array of structures:
        determine whether each member in each structure in the array of structures corresponds to the lock, and
        determine the owner of the lock, wherein software instructions to determine the owner of the lock comprise software instructions to:
          determine an address of the member, and
          identify the owner of the lock using the address.

13. The system of claim 12, further comprising software instructions to:
    generate a report recording the owner of the lock.

14. The system of claim 13, wherein the report comprises a lock type associated with the lock.

15. The system of claim 12, wherein the owner is a thread.

16. The system of claim 12, wherein the address is determined using a base address of the node, a member offset corresponding to the member, and an element offset corresponding to the structure in the array of structures.

17. The system of claim 16, further comprises software instructions to:
   initialize the list of nodes by setting the element offset to zero when the lock is a mutual exclusion lock.

18. The system of claim 12, wherein the lock is a mutual exclusion lock.

19. The system of claim 12, wherein the at least one node is generated by a system using priority inheritance to assign threads to the lock.

20. The system of claim 12, wherein the at least one node is generated by a system using adaptive locking behavior to assign threads to the lock.

21. A computer readable medium encoded with a program for identifying lock ownership, which when executed by a processor performs the steps of:
   identifying at least one node in a crash dump, wherein the at least one node corresponds to a memory object;
   characterizing the at least one node in the crash dump as a node of inferred type and appending the at least one node to obtain a list of nodes of inferred type, wherein the at least one node is of inferred type when the at least one node is initially designated as unknown type and is referenced by another node of known type and wherein the another node of known type is in the crash dump;
   determining whether each node in the list of nodes of inferred type is a structure; and
   for each node in the list of nodes determined to be a structure:
   determining whether each member in each node corresponds to a lock, determining an owner of the lock;
   determining whether each node in the list of nodes of inferred type is an array of structures;
   for each node in the list of nodes determined to be the array of structures:
      determine whether each member in each structure in the array of structures corresponds to the lock, and
      determine the owner of the lock, wherein software instructions to determine the owner of the lock comprise software instructions to:
         determine an address of the member, and
         identify the owner of the lock using the address.

* * * * *